Feb. 18, 1936.  W. CHAPMAN  2,031,032
MEANS FOR MIXING THE COLOR ELEMENT IMAGES IN MULTICOLOR
SCREEN PHOTOGRAPHIC PRINTING AND PROJECTION
Filed March 16, 1933  2 Sheets-Sheet 1

Inventor:-
Walter Chapman.
Per:- George Hughes
Attorney.

Feb. 18, 1936.                    W. CHAPMAN                    2,031,032
           MEANS FOR MIXING THE COLOR ELEMENT IMAGES IN MULTICOLOR
                  SCREEN PHOTOGRAPHIC PRINTING AND PROJECTION
                        Filed March 16, 1933          2 Sheets-Sheet 2
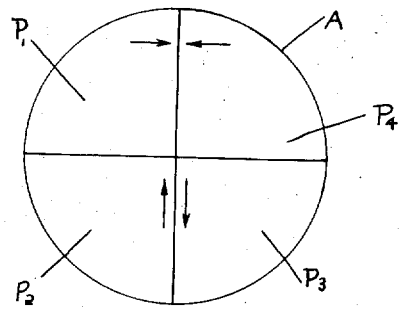
FIG.3.
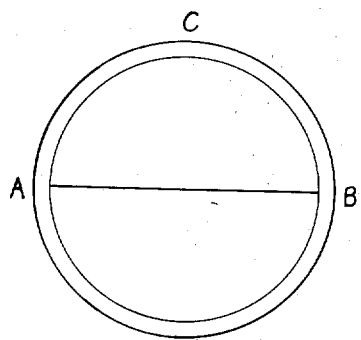   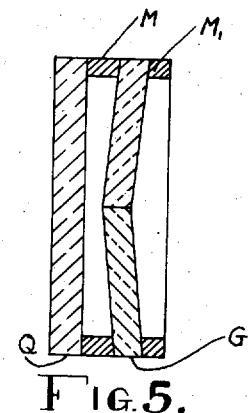
FIG.4.        FIG.5.
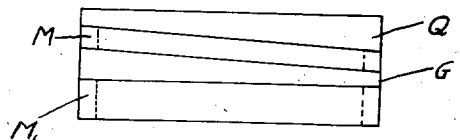
FIG.6.
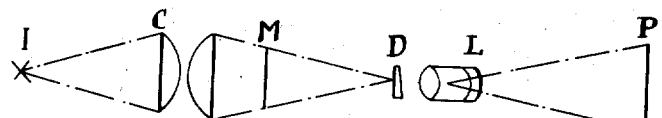
FIG.7.
Inventor:-
Walter Chapman.
Per: George Hughes
         Attorney.

Patented Feb. 18, 1936

2,031,032

UNITED STATES PATENT OFFICE

2,031,032

MEANS FOR MIXING THE COLOR ELEMENT IMAGES IN MULTI-COLOR SCREEN PHOTOGRAPHIC PRINTING AND PROJECTION

Walter Chapman, Palmers Green, London, England, assignor to Dufaycolor Limited, London, England Application March 16, 1933, Serial No. 661,076
In Great Britain July 7, 1932

2 Claims. (Cl. 88—16.4)

This invention relates to improved means for mixing the color element images in multi-color screen photographic printing and projection and it is particularly useful for the production of multi-color screen photographic copies from a multi-color screen photographic master by the use of an optical printer and an image multiplying device to overcome the lack of color element registration between the image of the master screen elements and the color screen elements of the copy, or for use in connection with the projection of multi-color screen transparencies onto a screen as in color cinematograph picture projection. The invention is particularly useful with the projection of three color photographs, the colors of which depend upon the use of a color screen having one color in continuous parallel lines and the other two colors in alternate dots filling in the spaces between these lines. However the invention can be applied to other known three color screens.

Various methods of increasing the useful printing area by multiplying the images of the color elements have been proposed in the printing of color screen copies from color screen masters such as the use of an oscillating glass plate, or the mechanical movement of the color screens or lenses, and some of these are described in the "History of three-color photography" by E. J. Wall, New York, 1922. For a two color line or regular geometric pattern screen the doubling produced by the use of a biaxial crystal is 100% efficient; while for a three color it varies from 66% to 100% according to the relative positions of the master and copy color screens. This is described in my U. S. A. Serial Number 585,155 dated January 6, 1932.

For a three color regular line screen, the triple image device of Berthon described in Patent No. 1,836,787 consisting of prism strips covering different areas of the lens is effective. I am aware that heretofore it has been proposed to employ a device for printing or reproducing colored images by contact printing in which prisms are located between the source of light and the negative color screen photograph with a view of producing a plurality of images on the film to be printed.

According to this invention a method of obtaining copies from three color screen master photographs in an optical printing machine or for projecting such type of color screen transparencies on to an observing screen so as to obtain a thorough mixing of the light transmitted through the master color screen or the screen of the transparency in the gate of the projector and falling on to the copy color screen or the observation screen is characterized by the use of an optical device constituting in itself means for quadrupling the image to produce an overlapping of the color elements. For example two double image devices working at right angles to each other can be located in the path of the projected beam.

The expression "quadrupling" for the purpose of this invention is to be regarded as being confined to the production of four images only and not four or more for example an infinity of such images as in the mechanical methods already mentioned. Also the definition of an optical device in the foregoing brief statement of invention is one in which the optical system does not rely upon the assistance of oscillation or other mechanical movement to obtain the desired result.

In this new method about to be described, I am concerned more particularly with the three color screen pattern produced by the Lumiere-Dufay process in which for example a green colored area has been impressed with grease lines, bleached, dyed red, cleansed, again grease lined, bleached and dyed blue thus producing a design of red and green rectangles separated by a blue line. The color scheme may be varied. Such a pattern does not lend itself to a triple image formation to produce complete overlap of all three colors. I therefore propose to use definitely a quadruple image.

I place in the path of the light rays between the master and copy photographs a double image prism as described in my U. S. A. Specification Serial No. 585,155. The image separation produced is the width of one color element. I then place immediately adjacent to the lens a doubling device to produce an image separation at right angles to that produced by the biaxial device. This doubling device may consist of two equal angle prisms, a parallel glass plate and a prism, or two prisms, the sum of whose deviation gives the required image separation.

They must bisect the aperture of the lens, and give an image separation of approximately one color element width. Such a doubling device will produce a double image of each of the two images formed by the biaxial prism, and thus ensure a thorough mixing of the master color screen element images.

In order to facilitate the understanding of the invention, I have appended hereto two sheets of drawings illustrating somewhat diagrammatically alternative forms of optical devices and also to an exaggeratedly enlarged scale the effect of utilizing an image quadrupling device, and wherein Fig. 1 shows a section of a transparency showing the arrangement of the color screen elements.

Fig. 3 shows an image quadrupling device embodying four prism segments.

Fig. 4 is a front elevation and

Fig. 5 is a sectional side elevation of an alternative form of image quadrupling device, and Fig. 6 is a plan view of such device.

Fig. 7 is a diagrammatic view showing the invention applied to a printing machine.

Figure 1:
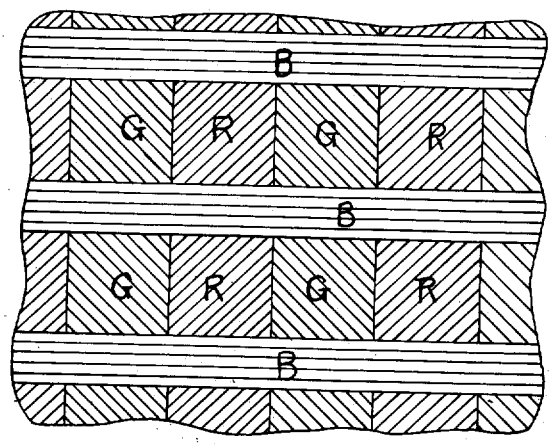
Figure 2:
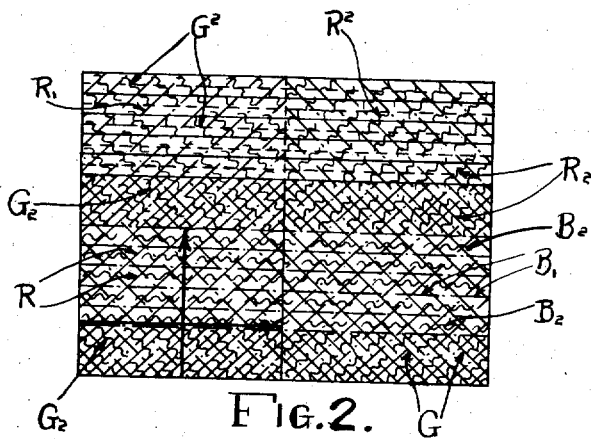
Fig. 2 shows the effect on the color elements obtained by the use of an image quadrupling device.

Dealing first with Figs. 1, 2 and 3, Fig. 1 as above stated is a part of a color screen and is of the type in which the colors are divided into continuous parallel blue lines B between which are located red dots R and green dots G in regular succession and in well known manner. This screen is known as the Lumiere-Dufay screen. The lines of alternate red and green squares R and G respectively have a side of one unit length and are separated by a blue line B of ½ unit width.

Fig. 2 shows the effect of first superimposing on the design a similar design indicated by the dot and dash lines B', G' and R', blue, green and red respectively, displaced as shown by the horizontal arrow one unit parallel to the blue line and then two other designs obtained by displacing each of the first mentioned images B, G and R and B', G' and R', three quarters of a unit in a direction at right angles to the blue line as shown by the vertical arrow, the screen elements appropriate to this displacement being indicated by the sinuous lines B², G² and R².

Assuming that the copy color screen is identical in design to that of the master, although this is not essential to the carrying out of the invention then the exposed area will vary from 0 to 100% according to the degree of coincidence between the master image and the copy color screen when no image multiplying device is employed.

For the purpose of following the action of the quadrupling device it will first be assumed that if a doubling device is used, then considering one set of units whose combined area is 2 x 1½ units equals 3 square units:—the illumination of this area from the 1st image is red 1 x 1, green 1 x 1, blue 2 x ½, that from the second image is red 1 x ¼ plus 1 x ¾, green 1 x ¼ plus 1 x ¾, blue 2 x ½ giving an effective exposing area of 6 square units.

When a quadruple device is employed as in Fig. 2, then the first doubling produces areas of red 1 x 1, green 1 x 1, blue 2 x ½, the doubling of the first image gives red 1 x ¼ plus 1 x ¾, green 1 x ¼ plus 1 x ¾, blue 2 x ½, while the doubling of the second image gives red 1 x ¼ plus 1 x ¾, green 1 x ¼ plus 1 x ¾, blue 2 x ½. These added to the areas of the first image give an effective exposure area of 12 square units. This mixture of the color element images produces a diffusion of the image well within that of standard lens performance, and in fact when added to by the circle of confusion inherent to the definition of the large aperture lenses commonly employed in optical printing machines gives a very near approximation to white light when no photographic image is interposed.

When this invention is used on a projecting system for visual purposes it obliterates the image on the screen of the color screen pattern. This is particularly useful for observers situated close to the screen.

For example if a Lumiere-Dufay pattern color screen such as has been described previously be projected on to a screen with a magnification of 240 times such as is usual in cinematograph theatres then if the red and green elements be squares of .001 inch side these will appear on the screen as squares of .24 inch. The image of a pure red object will show on the screen as a series of .24 inch red squares flanked by .24 black squares on two opposite sides and .12 inch wide black lines on the other sides, representing the minus or blocked out green and blue elements respectively. If my quadruple image device be fitted to the projecting lens, it will light up these dark squares and lines with red light and thus obliterate the images of the green and blue screen pattern. Similarly a white patch of light would appear on the screen as .24 inch squares of red and green separated by .12 wide blue lines, but by the application of my device these squares and lines would be thoroughly mixed to give the appearance of white light even though the observer was situated within the limit of his resolving power of .12 inch lines and .24 inch squares.

One method of obtaining the above result which shows the use of a displacement of the surface of a glass plate relative to the lens axis would be to employ a Wollaston double image prism in which the doubling is produced by the use of a prism of a biaxial crystal and having a glass compensating prism to bring the mean deviation of the emerging rays parallel to the direction of the incident ray. If this glass compensating prism be cut parallel to the plane of double refraction of the biaxial prism, that is to say, at right angles to the apex, and dividing the area of the prism into two equal parts, then by inclining these two halves, using the dividing line between them as a hinge, a quadruple image will be formed. Such an arrangement is shown in Figs. 4, 5 and 6 of the diagrams which show a quartz prism Q covering the whole lens aperture. This is so made that its plane of doubling lies parallel to the line AB. A compensating prism of glass G is separated from the quartz prism instead of being cemented to it in the usual way. This glass prism is cut into two parts along the line AB, and mounted between two metal rings M, M'. The outer ends of these rings are plane, while the inner ends are respectively "ridged" and "valleyed" to incline the two halves of the prism G in a direction at right angles to the line AB.

Another method particularly suitable as an adaptor for use on existing cinematograph projectors is shown in Fig. 3 which shows the lens aperture A divided into four equal areas P', P², P³ and P⁴ allocating a slight angle prism to each area. The direction of the deviations produced by such prisms being so orientated that they form two opposing couples lying at right angles. The effective image separation produced by each couple is approximately one color element.

In Fig. 7 is shown diagrammatically the method of applying the invention to a printing machine, in which the source of light is indicated by the reference letter I, the condenser by the reference letter C, and the master color screen transparency by the reference letter M. The quadruple image device is indicated by the reference letter D, and is located close to the projector lens L, the copy being printed being indicated by the reference letter P. The quadruple image device is located as closely as possible to the plane of the iris diaphragm associated with the lens L.

What I claim is:—

1. Method of obtaining copies from a three color Lumiere-Dufay screen so as to obtain a thorough mixing of the light transmitted through the master color screen consisting in displacing the color elements of the projected beam by optical means approximately one unit parallel to a given color line and then by additional optical means displacing each of the two sets or designs of elements approximately three quarters of a unit in a direction transverse relatively to the first direction of displacement.

2. In apparatus for the projection of multicolor photographic transparencies on to an observation screen the combination with the projector lens system of a bi-prism in the projection system so that the projected image passes through the bi-axial prism, and a compensating prism also in the line of projection from the said lens system and divided into two parts located opposite sides of and joined at a plane intersecting the optical axis of the lens system.

WALTER CHAPMAN.